United States Patent [19]

Prucha

[11] 3,746,824
[45] July 17, 1973

[54] MICROWAVE OVEN LEAKAGE RADIATION DETECTING DEVICE
[75] Inventor: Richard V. Prucha, Louisville, Ky.
[73] Assignee: General Electric Company, Louisville, Ky.
[22] Filed: Aug. 7, 1972
[21] Appl. No.: 278,570

[52] U.S. Cl. ............................ 219/10.55, 324/122
[51] Int. Cl. ............................................. H05b 9/06
[58] Field of Search................. 219/10.55; 324/122, 324/95; 325/67; 363; 340/228

[56] References Cited
UNITED STATES PATENTS
3,679,908   7/1972   Mazza............................. 219/10.55

Primary Examiner—J. V. Truhe
Assistant Examiner—Hugh D. Jaeger
Attorney—Richard L. Caslin et al.

[57] ABSTRACT

An electronic microwave oven has incorporated therewithin a leakage radiation detecting device for sensing and providing an indication of the presence of radiation escaping from the oven cavity past the door seal gasket. The device, located within the door frame of the oven, includes two metallic sensor probes coupled in parallel and extending in a resonant channel-like space formed by the inner surface of the door and the door frame external to the door seal gasket. The sensor probes are arranged so as to communicate with the electric field of the microwave energy and are longitudinally spaced within the channel by odd multiples of one-quarter wavelength of the excitation microwave frequency of the oven. The sensor probes are operatively coupled to voltage amplifier circuitry, the output of which is coupled to a responder. In the presence of radiation above a predetermined level escaping from the oven cavity, a voltage will be sensed by at least one of the probes and will be amplified by the amplifier circuitry so as to activate the responder, a neon lamp, providing a visible indication of the presence of the leakage radiation in excess of a predetermined level.

4 Claims, 2 Drawing Figures

Patented July 17, 1973          3,746,824

3,746,824

MICROWAVE OVEN LEAKAGE RADIATION DETECTING DEVICE

BACKGROUND OF THE INVENTION

The present invention relates to a device for sensing and indicating the presence of microwave radiation and in particular, a device built into a domestic microwave oven for sensing and indicating the presence of microwave radiation leaking from the oven cavity past the oven door seal.

Manufacturers of electronic microwave ovens take extreme care in the design of the oven to insure the safety of the user against leakage of microwave radiation, particularly around the oven door seal. However, despite the precautions taken by the manufacturer, it is sometimes possible for an oven to become leaky during its lifetime due to aging of the door seal gasket or due to accumulation of spilled food particles on the door seal. For the safety of the user, the Department of Health, Education and Welfare/Bureau of Radiological Health regulations specify that the maximum allowable leakage from any oven surface, other than in-factory measurements, be five milliwatts per square centimeter measured five centimeters from any oven surface.

A reliable device is needed, therefore, to sense and give to the operator an indication of possible leakage radiation at such a low level. One device is described in U.S. Pat. No. 3,436,508-Fritz wherein a pair of conductors are located on the oven cabinet just beyond the outer edge of the door opening and looped therearound and which are connected to an alarm means for announcing the presence of leakage radiation. Such a device, however, has certain disadvantages, the most important of which is lack of sensitivity. With conductor wires mounted in such a fashion, there is very little possibility of their being responsive to the electric field of the radiation since they generally would not be parallel with this electric field. Neither would they be responsive to the magnetic field of the radiation, the net effect upon the wires in this case being normally close to zero.

It is therefore the principle object of this invention to provide a device built into a domestic microwave oven for sensing and indicating the presence of microwave radiation leaking from the oven cavity past the door seal, a device that is sensitive to such small leaks as mentioned above but is relatively insensitive to the location of the leakage and is simple and trouble free as well as reliable.

SUMMARY OF THE INVENTION

In accordance with the present invention, a leakage radiation detecting device is designed to be incorporated within a microwave oven of the type having a metallic box-like oven liner and a metallic access door defining an oven cooking cavity. Means are provided for supplying microwave energy to the oven cavity and microwave radiation seal means are provided between the door and oven liner to prevent the escape of radiation from the oven cavity. Included are a plurality of electrically conductive sensor probes projecting into a resonant channel-like space external to the radiation seal means and continuing around the periphery thereof. The sensor probes are arranged so as to communicate with the electric field of the microwave energy and are longitudinally spaced within the resonant channel-like space by odd multiples of one-quarter wavelength at the operating mcirowave frequency of the oven. The device also includes signal processor means coupled with the sensor probes and responder means coupled with the output of the signal processor means for providing an indication of the presence of leakage radiation.

DESCRIPTION OF THE PREFERRED EMBODIMENT

Figure 1:
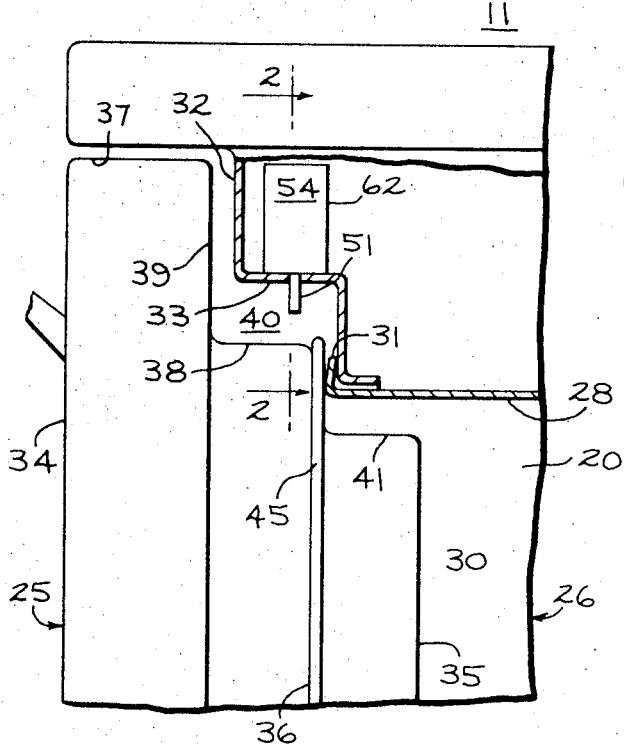
FIG. 1 is an enlarged fragmentary view, partly in section, of a portion of an electronic microwave oven incorporating a preferred embodiment of the present invention.

Referring to FIG. 1 of the drawing, there is illustrated a portion of a household electric range including an electronic microwave oven embodying the features of the present invention. A substantially box-like metallic oven liner 20, a portion of which is shown, in conjunction with the metallic access door 25 shown in the closed or vertical position, defines a microwave oven cooking cavity 26 therein. Liner 20 includes a rear wall (not shown), a top wall 28 (shown partially), a bottom wall (not shown) and a pair of side walls 30, one of which is shown. The forward edges of the top wall 28, the bottom wall and the side wall 30 define an opening into the cooking cavity 26, there being a continuous outwardly facing flange 31 which is bent back upon itself on the rear surface thereof as shown. The front door frame 32 has an opening therein slightly greater than the area defined by the outer edges of the flange 31 and has a rearwardly directed flange 33 which is suitably secured to the several walls of the oven liner 20 so as to interconnect the front door frame 32 and the oven liner 20.

Front opening access door 25 is mounted on the front of the oven 11 by hinge structure (not shown) and is movable about the lower edge thereof betwee a substantially horizontl open position and a substantially vertical closed position with respect to the open front of the oven cavity 26. Access door 25 more particularly includes a metal outer sheet 34, a metal inner sheet 35 spaced well inwardly of the outer sheet 34, and a metal intermediate sheet 36 disposed between the outer sheet 34 and the inner sheet 35. The outer sheet 34 carries an inturned flange 37 around the periphery thereof, flange 37 extending inwardly toward and to a point spaced a short distance from the front door frame 32 when the access door 25 is in its closed position. Intermediate sheet 36 has a forwardly directed flange 38 that carries an outwardly directed flange 39 extending therearound, flange 39 being suitably secured to flange 37. As illustrated, flange 38 forming a portion of the inner surface of the door 25 is disposed substantially parallel to and spaced a short distance from a portion of the flange 33 so as to define a resonant channel-like space such as continuous channel 40. This channel is designed to be resonant for an electro-magnetic propagation mode around its circumference at the operating frequency. Inner sheet 35 has a forwardly directed flange 41 around the periphery thereof extending toward the intermediate sheet 36 and is suitably secured thereto.

Microwave radiation seal means such as metallic radiation seal gasket 45, is fixedly attached to intermediate sheet 36 of door 25 and provides a seal and an electrical connection between the outer surface of the oven liner 20 and the inner surface of the door 25 and specifically, between the outwardly facing flange 31 on the oven liner 20 and the intermediate sheet 36 of the access door 25. Gasket 45 may be of the type described in U.S. Pat. No. 3,459,921—Fussell et al, and assigned to the same assignee as the present invention.

Figure 2:
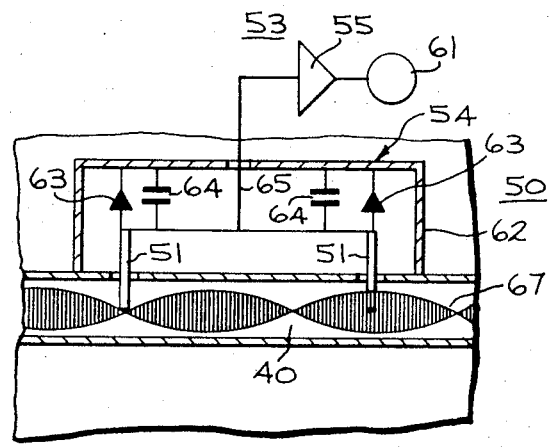
FIG. 2 is a fragmentary view, taken along the line 2—2 of FIG. 1, showing a preferred embodiment of the present invention with a symbolic representation of the associated circuitry.

In accordance with the present invention, a leakage radiation detecting device, such as that denoted generally as 50 in FIG. 2, is designed to be incorporated within microwave oven 11. Included are a plurality of electrically-conductive sensor probes such as metallic sensor probes 51 projecting into resonant channel 40 and isolated from the metallic structure of oven 11 as shown in the cutaway of FIG. 2. Sensor probes 51 are arranged so as to communicate with the electric field of a standing wave set up in channel 40 and are separated longitudinally in channel 40 by odd multiples of one-quarter wavelength at the operating microwave excitation frequency of oven 11; the separation chosen here is three-fourths wavelength. Sensor probes 51 are electrically coupled in parallel to a responder network, shown generally as 53 in FIG. 2. The network 53 includes signal processor means such as detector circuit 54 and amplifier circuit 55, both of conventional form, for detecting and amplifying the voltage developed at the sensor probes 51 in the presence of a microwave radiation field. The output of amplifier circuit 55 is coupled to a responder means 61, such as a neon lamp, to provide a visual indication of the presence of leakage radiation in channel 40. Detector circuit 54 is shown with each probe 51 being coupled serially with a common ground terminal 62 by a parallel arrangement of a diode 63 and a capacitor 64. The output 65 of the detector circuit 54 is shown symbolically coupled with amplifier circuit 55.

Should radiation leak from cooking cavity 26 past seal gasket 45 at any point therealong, a standing wave 67 will be set up in channel 40 as shown due to the resonance properties thereof. This standing wave 67 will be essentially continuous all around channel 40 and since sensor probes 51, spaced three-quarter wavelengths apart, are arranged so as to communicate with the electric field of the radiation, a voltage will be developed in at least one of the sensor probes which will be fed to the detector circuit 54 to be rectified and then fed to amplifier circuit 55. The amplified output thereof then will be fed to responder means 61 causing it to be activated, thereby giving an indication of the presence of leakage radiation. The energy level in channel 40 at which responder means 61 will be activated may be adjusted as by a potentiometer in amplifier circuit 55 and therby the device 50 may be calibrated to warn of the presence of leakage radiation in excess of predetermined level.

It should be considered that the location of such a detecting device as provided here should not be limited to its placement within the door frame in the uppermost portion of the microwave oven. It is only necessary that the sensor probes 51 project into a resonant channel located external to the radiation seal so as to communicate with the electric field of the standing wave microwave radiation and while there has been shown a resonant channel formed between the door and the door frame, it will be apparent to those skilled in the art that such a resonant channel may be formed within the door, as well as within the door frame. Nor is the application of such a device limited to the activation of a visual indicator. The output of the amplifier circuit may be fed to an audible alarm such as a buzzer and likewise may be coupled with the appropriate circuitry such as will cause the microwave energy supply means to be inactivated, thereby shutting off oven 11 when a leak does occur.

It should be apparent to those skilled in the art that the embodiment described heretofore is considered to be the presently preferred form of this invention. In accordance with the Patent Statues, changes may be made in the disclosed apparatus and the manner in which it is used without actually departing from the true spirit and scope of this invention.

What is claimed is:

1. A microwave oven having a metallic box-like oven liner and a metallic access door defining an oven cooking cavity, a door frame surrounding the oven liner adjacent the access door, means for supplying microwave energy to the oven cavity, microwave radiation seal means between the door and the oven liner to prevent the escape of radiation, a continuous, resonant, channel-like space external to the radiation seal means, and leakage radiation detecting means with a plurality of electrically-conductive sensor probes projecting into the resonant channel-like space so as to communicate with the electric field of the microwave energy and longitudinally spaced by odd multiples of one-quarter wavelength at the operating microwave frequency of the oven, signal processor means coupled with the sensor probes, and responder means coupled with the output of the signal processor means for providing an indication of the presence of leakage radiation.

2. A microwave oven having a metallic box-like oven liner and a metallic access door hingedly attached to the oven at the bottom thereof forming an oven cooking cavity, a front door frame surrounding the oven liner adjacent the front door opening, means for supplying microwave energy to the oven cavity, a metallic radiation seal gasket attached to the inner surface of the door around the periphery thereof and positioned to contact the liner flange around the entire opening when the door is closed for preventing the escape of radiation from the cavity, a continuous resonant channel defined by the inner surface of the door and the front door frame external to the gasket, and a leakage radiation detecting device with two metallic sensor probes coupled in parallel and projecting into the resonant channel so as to communicate with the electric field of the microwave energy and longitudinally spaced by odd multiples of one-quarter wavelength at the operating microwave frequency of the oven, signal processor means operatively coupled with the sensor probes and including means for adjusting the output thereof for calibration purposes, and responder means coupled with the output of the signal processor means for providing an indication of the presence of leakage radiation above a predetermined level.

3. The device of claim 2 wherein the sensor probes project into the channel in the uppermost section of the oven.

4. The device of claim 2 wherein the responder means is a neon lamp.

* * * * *